United States Patent
Iliadis et al.

(10) Patent No.: US 9,785,364 B2
(45) Date of Patent: Oct. 10, 2017

(54) INCREASING DATA STORAGE RELIABILITY IN A HETEROGENEOUS STORAGE SYSTEM

(71) Applicant: International Business Machines Corporation, Armonk, NY (US)

(72) Inventors: Ilias Iliadis, Rueschlikon (CH); Vinodh Venkatesan, Waedenswil (CH)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 14/886,018

(22) Filed: Oct. 17, 2015

(65) Prior Publication Data

US 2017/0109083 A1    Apr. 20, 2017

(51) Int. Cl.
*G06F 13/00* (2006.01)
*G06F 3/06* (2006.01)
(Continued)

(52) U.S. Cl.
CPC ............ *G06F 3/0619* (2013.01); *G06F 3/064* (2013.01); *G06F 3/0683* (2013.01); *G06F 3/0614* (2013.01); *G06F 3/0629* (2013.01); *G06F 12/023* (2013.01); *G06F 12/0623* (2013.01); *G06F 12/0646* (2013.01); *G06F 12/0692* (2013.01); *G06F 13/1694* (2013.01); *G06F 13/20* (2013.01); *G06F 13/385* (2013.01); *G06F 13/387* (2013.01)

(58) Field of Classification Search
CPC .... G06F 3/0614; G06F 3/0619; G06F 3/0629; G06F 3/064; G06F 3/0683; G06F 12/023; G06F 12/0623; G06F 12/0646; G06F 12/0692; G06F 13/20; G06F 13/385; G06F 13/387; G06F 13/1694
USPC ........ 711/145, 151, 154; 707/626, 635, 694, 707/752, 770, 785, 803; 710/10, 16, 20, 710/33, 37, 314; 712/15, 28, 225; 714/6.1, 6.2, 27
See application file for complete search history.

(56) References Cited

U.S. PATENT DOCUMENTS

7,308,532 B1 * 12/2007 Wood .................. G06F 11/1076
                                                      711/112
7,580,956 B1 *  8/2009 Xin ................... G06F 17/30067
(Continued)

*Primary Examiner* — Reba I Elmore
(74) *Attorney, Agent, or Firm* — Daniel P. Morris, Esq.; Otterstedt, Ellenbogen & Kammer, LLP (57) ABSTRACT

A method is provided for increasing data storage reliability in a heterogeneous storage system including multiple storage devices of different types. The devices store respective data subsets of a dataset. The method includes accessing configuration parameters for the dataset including first and second amounts of the data subsets respectively stored on the multiple storage devices. The method further includes estimating an initial global reliability of the heterogeneous storage system for the dataset, based on the configuration parameters. The method also includes determining an increased global reliability of the storage system for the dataset, by estimating a global reliability as would be obtained by modifying at least some of the configuration parameters, whereby at least the first and second amounts of the data subsets respectively stored on the devices are modified. The method further includes reconfiguring the dataset stored across the heterogeneous storage system according to the modified configuration parameters.

20 Claims, 3 Drawing Sheets

(51) Int. Cl.
  *G06F 12/06*   (2006.01)
  *G06F 12/02*   (2006.01)
  *G06F 13/20*   (2006.01)
  *G06F 13/38*   (2006.01)
  *G06F 13/16*   (2006.01)

(56) References Cited

U.S. PATENT DOCUMENTS

| | | | | |
|---|---|---|---|---|
| 7,739,579 | B2* | 6/2010 | Kameyama | G06F 11/1076 714/769 |
| 8,621,115 | B1* | 12/2013 | Bombet | G11B 19/02 710/10 |
| 8,880,801 | B1* | 11/2014 | Robins | G06F 12/0246 711/114 |
| 2008/0010499 | A1* | 1/2008 | Vingralek | G06F 11/008 714/6.11 |
| 2012/0265937 | A1* | 10/2012 | Resch | G06F 3/0617 711/118 |
| 2013/0007566 | A1* | 1/2013 | Shalvi | G11C 16/349 714/773 |
| 2013/0024601 | A1* | 1/2013 | Floman | G06F 12/0246 711/103 |
| 2013/0283125 | A1* | 10/2013 | Gladwin | G06F 3/0617 714/758 |
| 2014/0156812 | A1* | 6/2014 | Deng | H04L 41/0803 709/220 |
| 2014/0181382 | A1* | 6/2014 | Floman | G06F 12/0246 711/103 |
| 2015/0186411 | A1 | 7/2015 | Iliadis et al. | |
| 2016/0170871 | A1* | 6/2016 | Hyun | G06F 3/06 711/103 |

* cited by examiner

INCREASING DATA STORAGE RELIABILITY IN A HETEROGENEOUS STORAGE SYSTEM

BACKGROUND

The present invention relates generally to the electrical, electronic and computer arts, and, more particularly, to computerized methods and related systems for increasing data storage reliability in storage systems.

Modern data storage systems are extremely large and consist of several tens or hundreds of storage nodes. In such systems, node failures occur regularly (e.g., one or more times daily), and safeguarding data from such failures poses a serious design challenge.

Data redundancy, for example in the form of replication or advanced erasure codes, is often used to protect data from node failures. By storing redundant data across several nodes, the redundant data on surviving nodes can be used to rebuild the data lost by the failed nodes.

Modern data storage systems include heterogeneous storage systems, which comprise storage devices of different types. As an example, a hybrid storage system is a system that utilizes both solid-state drives (SSDs) and hard disk drives (HDDs) as storage media for persistent storage. That is, the solid-state drive is not used as a cache; rather, it is used at the same level of the memory hierarchy as the HDDs. Typically, arrays of multiple SSDs and arrays of multiple HDDs are used to form redundancy groups to achieve higher performance and reliability, using a redundant array of independent disks/drives (RAID) scheme or any other scheme.

One also knows various metrics to characterize hardware failures. For example, the mean time to data loss (MTTDL) metric gives the average time before a loss of data happens in a given array, where an array, e.g., a RAID array, joins two or more hard disks so that they make a logical disk. As another example, one also uses the expected annual fraction of data loss (EAFDL) as another metric. Such metrics pertain to one type of device.

One usually tries to improve the data storage reliability in each storage device or for each type of storage device.

SUMMARY

According to a first aspect, an embodiment of the present invention is directed to a method for increasing data storage reliability in a heterogeneous storage system. Such a system comprises two storage devices (or more) of two (or more) different types, the devices storing respective data subsets of a dataset. The method first comprises accessing, via one or more processors, configuration parameters for the dataset stored on the storage devices, the configuration parameters including amounts $U_1$ and $U_2$ of the data subsets respectively stored on the storage devices. More generally, where k>2 storage devices of different types are used, the considered configuration parameters may include amounts $U_1, \ldots, U_k$ of the data subsets respectively stored on the k storage devices. Next, an initial global reliability of the heterogeneous storage system for the dataset is estimated, via one or more processors, based on the accessed configuration parameters. Then, an increased global reliability of the heterogeneous storage system for the dataset is determined, via one or more processors, by estimating a global reliability as would be obtained by modifying at least some of the configuration parameters. This includes modifying at least the amounts $U_1, U_2$ of the data subsets respectively stored on two storage devices of different types. The method may proceed to reconfigure the dataset stored across the heterogeneous storage system according to the modified configuration parameters.

According to another aspect, an embodiment of the invention is directed to a heterogeneous storage system; i.e., a system comprising two or more storage devices of two or more different types. The system stores a computerized method for increasing data storage reliability therein, such as described above.

According to yet another aspect, an embodiment of the invention is directed to a computer program product for increasing data storage reliability in a heterogeneous storage system such as described above.

Storage systems, methods and computer program products embodying the present invention will now be described, by way of non-limiting examples, and in reference to the accompanying drawings.

BRIEF DESCRIPTION OF THE SEVERAL VIEWS OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of the present invention will be described herein in the context of illustrative apparatus and methods for increasing data storage reliability in heterogeneous storage systems. It is to be appreciated, however, that the invention is not limited to the specific apparatus and/or methods illustratively shown and described herein. Rather, it will become apparent to those skilled in the art given the teachings herein that numerous modifications can be made to the embodiments shown that are within the scope of the claimed invention. That is, no limitations with respect to the embodiments shown and described herein are intended or should be inferred.

The following description is structured as follows. First, general embodiments and high-level variants are described (Sect. 1); the next section addresses more specific illustrative embodiments and technical implementation details (Sect. 2).

1. General Embodiments and High-Level Variants

Figure 1:
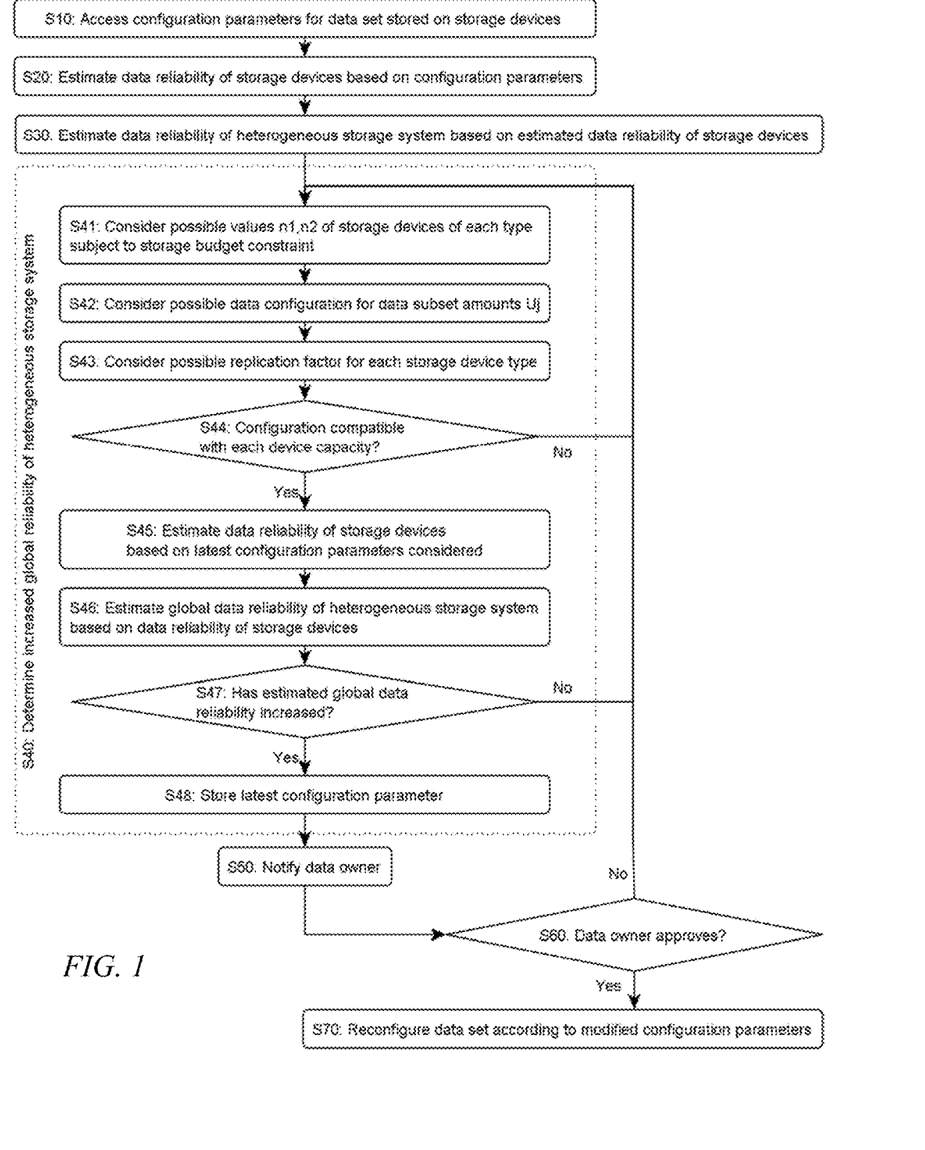
FIG. 1 is a flowchart illustrating high-level steps of an illustrative method for increasing data storage reliability in a heterogeneous storage system, according to an embodiment of the invention.
Figure 2:
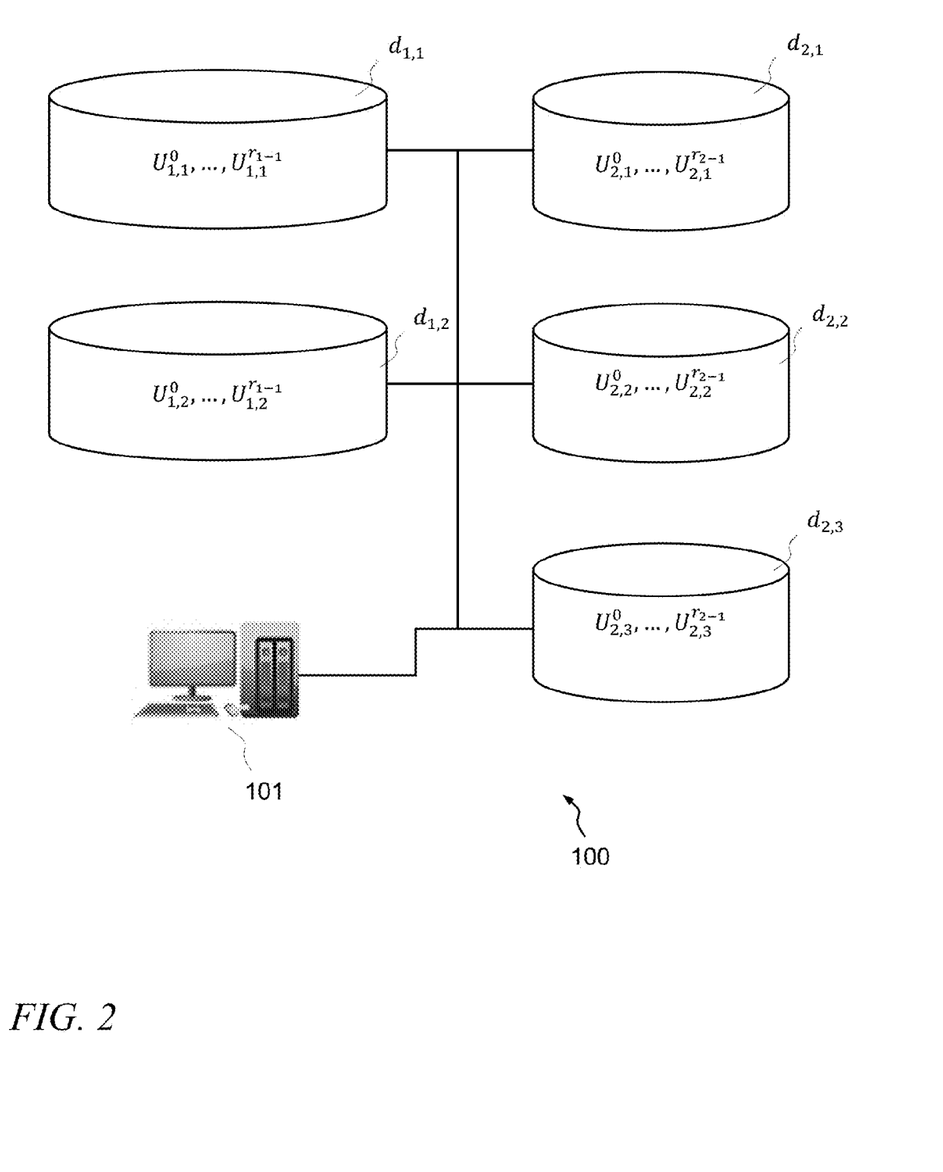
FIG. 2 schematically represents at least a portion of an exemplary heterogeneous storage system suited for implementing method steps such as illustrated in FIG. 1, according to an embodiment of the invention.
Figure 3:
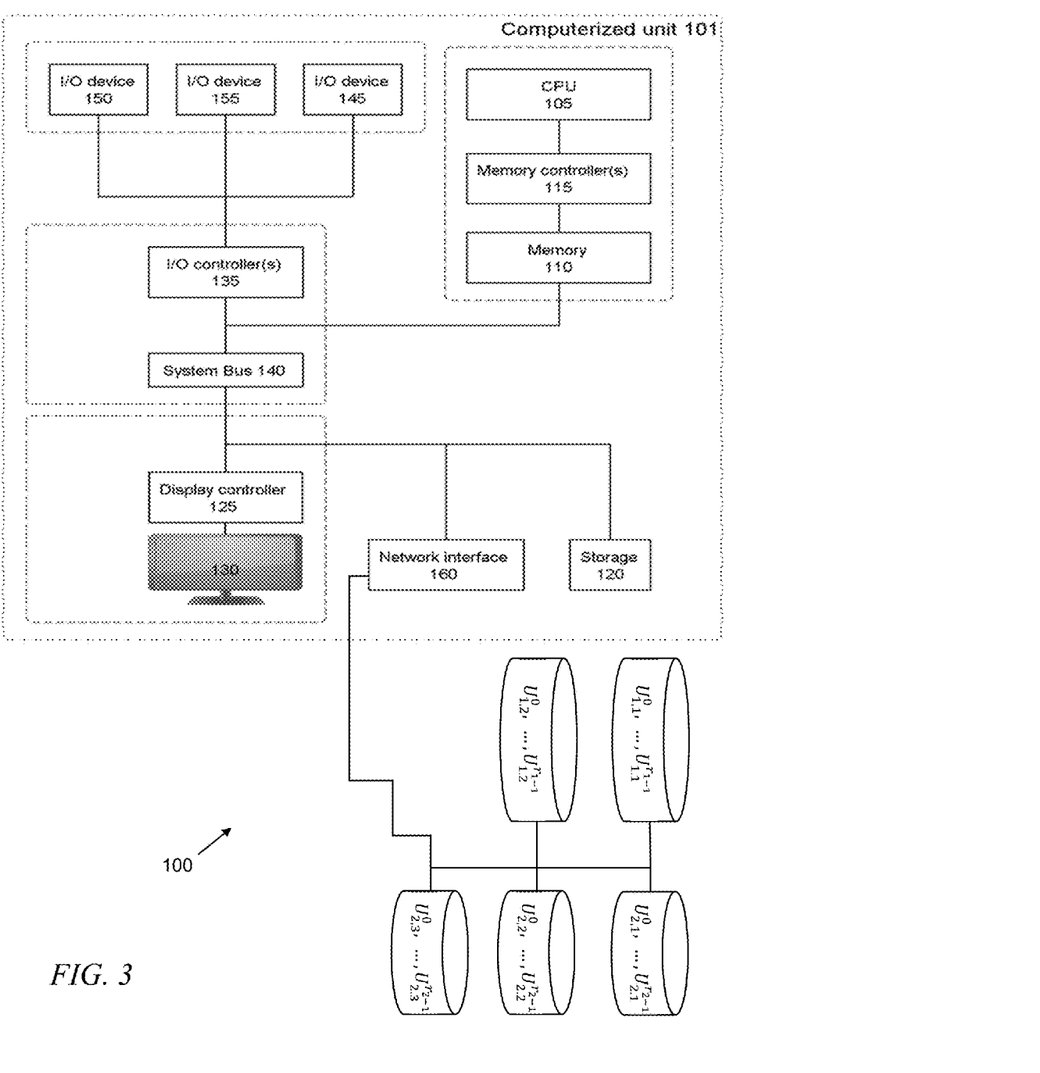
FIG. 3 schematically represents at least a portion of a general-purpose computerized system configured for implementing one or more method steps such as illustrated in FIG. 1, according to an embodiment of the invention.

In reference to FIGS. 1 through 3, an aspect of an embodiment of the invention is first described, which concerns a method for increasing data storage reliability in a heterogeneous storage system 100. The system 100 comprises two or more storage devices of two or more different types; that is, there are at least two devices of different types and there may be any number n≥1 of devices of each type, where n is an integer. The devices store respective data subsets of a dataset. This method is implemented, in one or more embodiments, via one or more processors which may be localized at a compute and/or storage node 101 of the system 100 (as assumed in FIGS. 2 and 3) or distributed across multiple compute and/or storage nodes of the system 100.

The method first comprises accessing S10 configuration parameters for the dataset stored on the storage devices. The configuration parameters notably include amounts $U_1$ and $U_2$ of data subsets that are respectively stored on two (or more) storage devices. FIG. 2 assumes two different types of storage devices and will be later described in further detail. More generally, where k>2 storage devices of different types are used, the considered configuration parameters may include amounts $U_1, \ldots, U_k$ of the data subsets respectively stored on the k storage devices.

The present method then proceeds to estimate S20, S30 an initial global reliability of the heterogeneous system 100 for the dataset of interest: S20 estimates data reliability of storage devices based on the accessed configuration parameters, and S30 estimates data reliability of heterogeneous storage system based on estimated data reliability of storage devices. Next, the computerized method determines S40 an increased global reliability S47 of the heterogeneous system 100 for the dataset. The determination S40 can be achieved by way of simulation, variation or any type of optimization; i.e., the determination estimates S41-S46 a global reliability as would be obtained by modifying S41-S43 at least some of the configuration parameters. This includes simulating the modification S42 of at least the amounts $U_1$ and $U_2$ in the above example. More generally, a modification of two or more of the amounts $U_1, \ldots, U_k$ of the data subsets as stored on the k storage devices would be considered.

Finally, the method instructs to reconfigure S70 the storage of the dataset across the heterogeneous storage system 100, according to the modified configuration parameters.

The above scheme facilitates the determination of a new data storage configuration, which has a globally improved (i.e., increased) data reliability. At variance with known methods, the determination is based on a global reliability estimate for the data as stored across the storage devices. That is, the above method seeks to improve a global reliability estimate for the heterogeneous system instead of seeking to improve data reliability at the level of the storage devices (or the different types of storage devices). Still, a global reliability estimate can be devised based on configuration parameters of the storage devices composing the heterogeneous system.

The estimated reconfiguration is lossless, according to one or more embodiments. That is, the total amount $U=U_1 \cup U_2$ (or more generally $U=U_1 \cup U_2 \ldots \cup U_k$) of data stored on the storage devices is preserved by the optimization. Note that the optimization does not necessarily need to lead to an absolute optimum. It is sufficient that the new configuration determined exhibits a global data reliability estimate that is larger than the initially estimated global data reliability.

Determining a new configuration involves modifying the amounts of the data subsets respectively stored on the storage devices. That is, the new configuration involves data that are, a minima, rearranged across the heterogeneous storage system. The estimation may furthermore involve the modification of other configuration parameters, as discussed herein below. In particular, the determination of the new configuration may be subject to a given storage budget for the storage of such data.

Namely, the step of determining S40 the increased global reliability may, in one or more embodiments, be performed by estimating S41-S46 a global reliability as would be obtained by reconfiguring the data stored across the storage devices, subject S41 to a given storage budget for storing such data. A practical example is given in Sect. 2.1. Beyond a storage budget that an owner may afford or impose, this constraint may capture the resources available and storage design choice of the storage provider and/or the data owner. In particular, the underlying simulations may lead to estimate the global reliability of various heterogeneous storage system configurations (i.e., corresponding to distinct sets of configuration parameters), in which case each of the sets of configuration parameters may be subject S41 to such a constraint.

Preferably, the initial configuration parameters may include other parameters, such that the subsequent step S40 will further comprise estimating S46 the global reliability as would be obtained by modifying S43 such additional parameters, in addition to modifying S42 the amounts of the data subsets stored on the different types of devices. For instance, the initial configuration parameters, in one or more embodiments, may further include replication factors used by each of the different types of storage devices. In that case, step S40 may further comprise estimating S46 the global reliability as would be obtained by modifying S43 the replication factors, in addition to modifying S42 the sole amounts of the data subsets.

In addition, the configuration parameters may further include non-modifiable parameters; e.g., inherent to each type of storage devices. The non-modifiable parameters may, in one or more embodiments, include one or more of:

A reliability characteristic, e.g., call them $\lambda_1$ and $\lambda_2$, for two different types of devices (one may more generally consider $\lambda_1 \ldots \lambda_k$ reliability characteristics fork types of devices). An example of definition for such a reliability characteristic is given below;

A storage capacity $c_1, c_2$ (or more generally $c_1 \ldots c_k$);

A rebuild bandwidth $b_1, b_2$ (or $b_1 \ldots b_k$); and

A rebuild rate $\mu_1, \mu_2$, (or $\mu_1 \ldots \mu_k$).

Estimating S41-S46 the global reliability may accordingly be performed taking into account any one or more of the above, non-modifiable parameters, in addition to modifying S42, S43 the amounts of data subsets and replication factors.

In addition, embodiments of the present methods may consider the numbers of devices of each type, e.g., the number $n_1$ of storage devices of the first type and the number $n_2$ of storage devices of the second type, where more than two devices are considered, e.g., $n_1>1$ and/or $n_2>1$. The configuration parameters may thus include $n_1$ and $n_2$. Such parameters may, in one or more embodiments, be varied to determine an increased global reliability. Namely, the estimation S41-S46 of the global reliability may comprise estimating the global reliability as would be obtained by varying S41 one or each of $n_1$ and $n_2$ (or more generally one or each of $n_1 \ldots n_k$) in addition to modifying S42, S43 the amounts of the data subsets (and possibly the replication factors).

Should a storage budget constraint apply, the numbers $n_1 \ldots n_k$ of storage devices may be varied S41 subject to said given storage budget constraint.

In one or more embodiments, step S40 comprises estimating S46 a global mean time to data loss MTTDL metric; i.e., a metric pertaining to the heterogeneous storage system, based on mean times to data loss $MTTDL_j$ as estimated for storage devices of type j, which are themselves estimated S45 according to the modified S41-S43 configuration parameters.

For example, the mean time to data loss as estimated S45 for a storage device of type j may be defined as $MTTDL_j = \mu_j^{\hat{}}(r_j-1)/(n_j \lambda_j^{\hat{}} r_j)$, where $\mu_j$, $r_j$, $n_j$, and $\lambda_j$ respectively denote the rebuild rate, the replica number, the number of storage devices of type j and the reliability characteristic of the storage devices of type j in the heterogeneous storage system 100. The rebuild rate $\mu_j$ may be defined as $\mu_j = b_j n_j / U_j$, where $b_j$ and $U_j$ respectively denote the rebuild bandwidth for a storage device of type j and the amount of data stored on all the storage devices of type j.

Simulations have been performed which demonstrate that the global mean time to data loss can faithfully be estimated S46 as a harmonic mean of the mean times to data loss $MTTDL_j$ of all the types of storage devices considered.

In the particular illustrative embodiment of FIG. 1, step S40 comprises estimating S46 a global reliability as would be obtained by modifying S41, S43, each of:

The numbers $n_j$ of storage devices for each of type j of devices, in a limit compatible with the given storage budget constraint, step S41;

The amounts $U_j$ of data subsets, step S42; and

The number of replicas of data stored on each type of storage devices, step S43.

Then, if the simulated reconfiguration is compatible S44 with the storage capacities of the storage devices, the method of FIG. 1 proceeds to calculate S45, S46 the global mean time to data loss that corresponds to the modified parameters. In the example of FIG. 1, the global MTTDL is calculated S46 based on the MTTDLs as first calculated for each type of device S45, which provides useful intermediate indicators. However, in alternative embodiments, the global MTTDL may be directly calculated based on the simulated reconfiguration.

For completeness, in the embodiment of FIG. 1, if S47 an increased global reliability can be determined, the corresponding configuration parameters are stored S48 and the owner of the dataset is notified S50 that an increased, global data reliability can potentially be achieved. Upon receiving acceptance S60 from the owner to accordingly reconfigure his/her dataset, the method may finally instruct reconfiguration S70 of the dataset across the heterogeneous system, according to the previously determined configuration parameters S47, S48.

More generally, and in alternative embodiments to the method depicted in FIG. 1, present methods may be extended to other redundancy and placement schemes, such as declustered placement or erasure codes, etc., by devising appropriate MTTDL definitions. Amongst other redundancy and placement schemes, the initial configuration parameters may, for instance, include erasure codes, e.g., RAID-5, RAID-6, Reed Solomon codes, etc., to correct errors associated with storage defects on the storage devices. Thus, step S43 may simulate a modification of erasure codes, in addition to modifying amounts of data subsets stored on the storage devices.

Other embodiments may use another metric, such as an expected annual fraction of data loss (EAFDL), instead of MTTDL. Namely, the determination S40 of the increased global reliability may revolve around estimating S46 a global EAFDL pertaining to the heterogeneous storage system, based S45 on expected annual fractions of data loss estimated calculated for each type of storage devices, according to the modified configuration parameters.

It can be shown that a global expected annual fraction of data loss is best estimated as a weighted mean of the expected annual fractions of data loss, as calculated for each type of devices, according to one or more embodiments. The weight coefficients $\alpha_i$ used are defined as $\alpha_i = U_i/U$, where $U = U_1 + \ldots + U_k$ and $U_i$ denotes the amount of data stored on all of the storage devices of type i.

Referring now more particularly to FIGS. 2 and 3, according to another aspect, the invention can also be embodied as a heterogeneous storage system 100 comprising two or more storage devices $d_{i,j}$ of two or more different types i. In FIG. 2, the storage devices are denoted by $d_{i,j}$ where i stands for the $i^{th}$ type of device and j denotes the $j^{th}$ device of type i. A particular device $d_{i,j}$ stores a respective data subset $U_{i,j}$ of a given dataset U. Correspondence with the previous notation $U_i$ (where $U_i$ pertained to the amount of data stored on all the storage devices of a given type i) is established via the relation $U_i = \Sigma_j U_{i,j}$. For completeness, in FIG. 2, a given device $d_{i,j}$ stores data $U_{1,1}^0, \ldots, U_{1,1}^{r_1-1}$, where the superscript denotes the replica number $r_i$ as used for a device of type i. In the example of FIG. 2, two types of devices are used (so that i=1 or 2; there are two devices (j=1 or 2) for the first type of device (i=1), and there are three devices (j=1, 2 or 3) for the second type of device (i=2). The devices $d_{i,j}$ form part of the heterogeneous system 100, which, in this example, further comprises a compute node 101, which implements a computerized method that is executed by one or more processors of the node 101. FIG. 3 illustrates components of this node 101, which are discussed in detail herein below.

This computerized method causes the system 100 to perform steps as previously described in connection with FIG. 1. This notably comprises: accessing S10 configuration parameters; estimating S20, S30 the initial global reliability of the heterogeneous storage system 100; determining S40 an increased global reliability S47 by estimating S41-S46 a global reliability as would be obtained by modifying S41-S43 at least some of the configuration parameters; and reconfiguring S70 the dataset accordingly. The system 100 may be configured to perform other steps and variants as previously described.

The invention may similarly be embodied as a computer program product, comprising a non-transitory computer readable storage medium having program instructions embodied therewith, the program instructions being executable by one or more processors to perform such steps.

The above embodiments have been succinctly described in reference to the accompanying drawings and may accommodate a number of variants. Several combinations of the above features may be contemplated; some examples are described herein below.

2. Specific Embodiments/Technical Implementation Details 2.1 Specific Embodiments Data stored in a heterogeneous storage system may have different degrees of significance. For instance, metadata contain significant information related to the remaining of data. Consequently, a loss of metadata may affect a large amount of stored data. As redundancy is used to protect data from loss, one may want to offer a higher degree of redundancy to most significant data, such as metadata, compared to other data. Higher redundancy can be offered in several ways, including:

Through coding schemes that offer various degrees of redundancy, and

Through storing valuable data to highly reliable devices.

Let us consider the case where two types of devices are available in the system 100 (e.g., a first type being "reliable", the second type being "very reliable"). A user may accordingly store some of his/her data on the "reliable" devices and the remaining data on the "very reliable" devices. To ensure a satisfactory degree of reliability, a higher degree of protection needs be offered to data stored on the "reliable" devices than data stored on the "very reliable" devices.

One problem is therefore the following. As before, the user data U is separated into two categories ($U_1$ and $U_2$, such that $U=U_1 \cup U_2$). Data $U_1$ is placed on a first type of device, the latter characterized by the reliability characteristic $\lambda_1$, which can be taken as its failure rate. Let $b_1$ denote the device bandwidth used for rebuild and $d_1$ denote the cost of such a device (be it in terms of money, energy, etc.). A certain degree of reliability, expressed by the mean time to data loss $MTTDL_1$, is obtained by employing a replication-based redundancy scheme with $r_1$ replicas. Similarly, data $U_2$ is placed on a second type of device characterized by the reliability characteristic $\lambda_2$. Let $b_2$ denote the device bandwidth used for rebuild and $d_2$ denote the cost of such a device. Another degree of reliability, expressed by the mean time to data loss $MTTDL_2$, is obtained by employing a replication-based redundancy scheme with $r_2$ replicas.

As explored in the previous section, it is advantageous to efficiently assess the overall reliability, e.g., in terms of the mean time to data loss (MTTDL) or the expected annual fraction of data loss (EAFDL) of each type of device. This makes it possible to appropriately dimension the system to meet specific reliability requirements. For example, for a given cost budget B, one would like to assess whether changing the amount of data placed on each of the two device categories, the replication factor on each category, as well as the number of devices in each category can potentially lead to a higher, system-wide reliability, that is, to a higher MTTDL or to a lower EAFDL.

In a scenario as described above, the individual reliabilities $MTTDL_1$ and $MTTDL_2$ can be assessed by taking into account the system parameters; that is, the number of different types of devices ($n_1$ and $n_2$), their reliability characteristics ($\lambda_1$ and $\lambda_2$), the corresponding device storage capacities ($c_1$ and $c_2$), rebuild bandwidths ($b_1$ and $b_2$), and rebuild rates ($\mu_1$ and $\mu_2$), the replication-based redundancy scheme used, and the amount of user data stored on these devices, denoted by $U_1$ and $U_2$, respectively.

In the following, a preferred, detailed procedure is presented that takes into consideration the two MTTDLs ($MTTDL_1$ and $MTTDL_2$), and yields the overall MTTDL of the system considered. Subsequently, another procedure is used to explore whether the system-wide reliability, expressed by the overall MTTDL, can be improved by rearranging user data, varying the replication factor used on the two types of devices, as well as changing the number of each type of device according to the total amount of available budget B. If there is such a constellation, the data owner is notified and, upon acceptance, the storage of his/her dataset is reconfigured across the system. These procedures have the following advantages over previous schemes:

The data reliability is increased (e.g., maximized) for a given storage budget; and As the volume of stored data changes, the same method can be reapplied for a fixed number of $n_1$ and $n_2$ devices so as to keep data reliability of the system at an optimal level.

First, $MTTDL_1$ is assessed for data stored on the first type of device, and then $MTTDL_2$, for data stored on the second type of device. Then, the system-wide MTTDL is obtained as a function of $MTTDL_1$ and $MTTDL_2$.

In particular, for a clustered replica placement, we have:

$$MTTDL_1 = \mu_1^{\wedge}(r_1-1)/(n_1\lambda_1^{\wedge}r_1), \text{ and}$$

$$MTTDL_2 = \mu_2^{\wedge}(r_2-1)/(n_2\lambda_1^{\wedge}r_2),$$

where $\mu_1$ and $\mu_2$ represent the rebuild rates in the two types of devices and are given by:

$$\mu_1 = b_1 n_1 / U_1, \text{ and}$$

$$\mu_2 = b_2 n_2 / U_2.$$

Then, the system-wide MTTDL can adequately be obtained as the harmonic mean of $MTTDL_1$ and $MTTDL_2$, that is:

$$MTTDL = 1/(1/MTTDL_1 + 1/MTTDL_2).$$

Next, all possible values of $n_1$ and $n_2$ are considered, in one or more embodiments, such that the devices can be bought or made available within a given cost budget B; that is, the algorithm considers all non-negative values of $n_1$ and $n_2$ such that $n_1 d_1 + n_2 d_2 \leq B$. For each of the possible pairs of values of $n_1$ and $n_2$, we consider a set of possible values of $U_1$ and $U_2$ such that $U = U_1 \cup U_2$. This set may be obtained, for example, by splitting the data in fractions of $U_1$, for example, multiples of 10% (in terms of total amounts), which can be symbolically noted as $U_1 = x \; 0.1 \; U$, with $x=0, 1, \ldots, 10$. For each value of $n_1, n_2, U_1$, and $U_2$ considered, a number of different replication factors, e.g., 1 to 4, are considered. If the values of $n_1, n_2, r_1$, and $r_2$ are such that the replicated data cannot fit in the chosen type of device, that is, if $n_1 c_1 > U_1 r_1$ or $n_2 c_2 > U_2 r_2$, then this configuration is rejected. Otherwise, the corresponding MTTDL value is assessed. By assessing the MTTDL values of all configurations considered, an optimal configuration can be found, in accordance with one or more embodiments.

By way of example only, consider the following non-limiting scenario, where the budget is of $0.6/GB ($0.6 per Gigabyte), the total amount of data to be stored is $U=100$ TB, such that the total budget is $B=\$0.6/GB \times 100e3$ GB=$60,000.

Assume now that the following values apply for devices in Tier 1 (first type of devices):

The cost of a single device is $p_1=\$400$;

The device storage capacity is $c_1=4$ TB;

The device rebuild bandwidth is $b_1=17.5$ MB/s; and

The device failure rate is $\lambda_1=6.342e-9/s$ (i.e., once in approximately 5 years).

For devices in Tier 2 (second type of devices), we have:

The cost of a single device is $p_2=\$600$;

The device storage capacity is $c_2=400$ GB;

The device rebuild bandwidth is $b_2=35$ MB/s; and

The device failure rate is $\lambda_2=6.342e-9/s$ (i.e., once in approximately 5 years).

For the example considered above, the maximum system MTTDL obtained according to the above procedure, under the given budget, is 1332 years, with a replication factor of 3 on tier 1 and a replication factor of 2 on tier 2, and with 90% of the user data on tier 1 (that is, $U_1=0.9$ U).

The above procedure can easily be extended to other redundancy and placement schemes, such as, but not limited to, declustered placement, erasure codes, etc., by using appropriate MTTDL equations. Moreover, the present concepts can also be extended to other reliability metrics, such as, but not limited to, the expected annual fraction of data loss (EAFDL). For example, if the data on devices of the first and second types have an EAFDL value respectively denoted by $EAFDL_1$ and $EAFDL_2$, the global EAFDL of the system is adequately obtained as the weighted average of the two EAFDLs, that is, $$EAFDL=\alpha EAFDL_1+(1-\alpha)EAFDL_2,$$

where $\alpha=U_1/(U_1+U_2)$.

The above considerations extend to systems with k types of devices by extending the definitions of the MTTDL and EAFDL as follows:

$$MTTDL=1/(1/MTTDL_1+\ldots+1/MTTDL_k), \text{ and}$$

$$EAFDL=\alpha EAFDL_1+\ldots+\alpha_k EAFDL_k,$$

where, just as before, $MTTDL_i$ and $EAFDL_i$ denote the MTTDL and EAFDL of the $i^{th}$ type of device, respectively, and $\alpha_i=U_i/(U_1+\ldots+U_k)$, with $U_i$ denoting the amount of user data stored on the $i^{th}$ device type and $U=U_1 \cup \ldots \cup U_k$.

2.2 Computerized Devices

Computerized devices can be suitably designed for implementing embodiments of the present invention as described herein. In that respect, it can be appreciated that the methods described herein are largely non-interactive and automated. In exemplary embodiments, the methods described herein can be implemented either in an interactive, partly interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. More generally, embodiments of the present invention can be implemented wherein general-purpose digital computers, such as personal computers, workstations, etc., are used.

For instance, the system 100 depicted in FIG. 3 schematically represents a computerized unit 101, e.g., a general-purpose computer. FIGS. 2 and 3 assume that this computerized unit 101 is designed to implement steps of the present methods (in variants, the tasks corresponding to such steps may be performed in a distributed fashion, by nodes of the system 100).

In exemplary embodiments, in terms of hardware architecture, as shown in FIG. 3, the unit 101 includes a processor 105, memory 110 coupled to a memory controller 115, and one or more input and/or output (I/O) devices 145, 150, 155 (or peripherals) that are communicatively coupled via a local input/output controller 135. The input/output controller 135 can comprise or connect to one or more buses 140 or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), or generally any device for executing software instructions. The processor, when configured according to the software instructions implementing one or more embodiments of the invention, becomes a new hardware module capable of performing method steps according to embodiments of the invention.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 3, the software in the memory 110 includes methods described herein in accordance with exemplary embodiments and a suitable operating system (OS). The OS essentially controls the execution of other computer programs and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS. Furthermore, the methods can be written as an object oriented programming language, which has classes of data and methods, or a procedure programming language, which has routines, subroutines, and/or functions.

Possibly, a conventional keyboard 150 and mouse 155 can be coupled to the input/output controller 135. Other I/O devices 140-155 may include other hardware devices.

In addition, the I/O devices 145-155 may further include devices that communicate both inputs and outputs. The system 100 can further include a display controller 125 coupled to a display 130. In exemplary embodiments, the system 100 can further include a network interface or transceiver 160 for coupling to a network.

The network transmits and receives data between the unit 101 and other nodes (like storage devices) of the system 100 or external systems. The network is possibly implemented in a wireless fashion, e.g., using wireless protocols and technologies, such as WiFi, WiMax, etc. The network may be a fixed wireless network, a wireless local area network (LAN), a wireless wide area network (WAN) a personal area network (PAN), a virtual private network (VPN), intranet or other suitable network system and includes equipment for receiving and transmitting signals.

The network can also be an IP-based network for communication between the unit 101 and any external server, client and the like via a broadband connection. In exemplary embodiments, network can be a managed IP network administered by a service provider. Besides, the network can be a packet-switched network such as a LAN, WAN, Internet network, etc.

If the unit 101 is a PC, workstation, intelligent device or the like, the software in the memory 110 may further include a basic input output system (BIOS). The BIOS is stored in ROM so that the BIOS can be executed when the computer 101 is activated.

When the unit 101 is in operation, the processor 105 is configured to execute software stored within the memory 110, to communicate data to and from the memory 110, and to generally control operations of the computer 101 pursuant to the software. The methods described herein and the OS, in whole or in part are read by the processor 105, typically buffered within the processor 105, and then executed. When the methods described herein are implemented in software, the methods can be stored on any computer readable medium, such as storage 120, for use by or in connection with any computer related system or method.

2.3 Computer Program Products

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A method for increasing data storage reliability in a heterogeneous storage system, the system comprising two or more different types of storage devices, the devices storing respective data subsets of a dataset, the method comprising:

accessing, via one or more processors, configuration parameters for the dataset stored on the storage devices, the configuration parameters including respective amounts, comprising $U_1$ and $U_2$, of the data subsets respectively stored on the two or more different types of storage devices;

estimating, via one or more processors, an initial global reliability of the heterogeneous storage system for the dataset, based on the accessed configuration parameters including the respective amounts of the data subsets stored on the two or more different types of storage devices;

determining, via one or more processors, an increased global reliability of the heterogeneous storage system for the dataset, by estimating a global reliability as would be obtained by modifying at least some of the configuration parameters, wherein at least the respective amounts $U_1$ and $U_2$ of the data subsets stored on the two or more different types of storage devices are modified to increase the global reliability of the heterogeneous storage system for the dataset; and reconfiguring the dataset stored across the heterogeneous storage system according to the modified configuration parameters including the modified respective amounts of the data subsets stored on the two or more different types of storage devices.

2. The method of claim 1:

wherein determining the increased global reliability is performed by estimating a global reliability as would be obtained by reconfiguring the data stored across the different types of storage devices, subject to a given storage budget constraint for storing such data; and wherein determining the increased global reliability comprises estimating a global reliability of various heterogeneous storage system configurations corresponding to distinct sets of configuration parameters, each of the sets subject to said given budget constraint.

3. The method of claim 1, wherein the initial configuration parameters further include respective erasure codes to correct errors associated with storage defects on each of the two or more different types of storage devices, and wherein determining the increased global reliability further comprises estimating the global reliability as would be obtained by modifying the erasure codes, in addition to modifying the amounts of the data subsets respectively stored thereon.

4. The method of claim 1, wherein the initial configuration parameters further include replication factors used by each of the two or more different types of storage devices, and wherein determining the increased global reliability further comprises estimating the global reliability as would be obtained by modifying the replication factors, in addition to modifying the amounts of the data subsets respectively stored thereon.

5. The method of claim 1, wherein
the configuration parameters accessed further include non-modifiable parameters, inherent to each of the two or more different types of storage devices, which non-modifiable parameters include one or more of the following: a reliability characteristic $\lambda_1$, $\lambda_2$; a storage capacity $c_1$, $c_2$; a rebuild bandwidth $b_1$, $b_2$ and a rebuild rate $\mu_1$, $\mu_2$, and
estimating the global reliability is performed according to the non-modifiable parameters, in addition to the modified amounts of the data subsets.

6. The method of claim 1:
wherein the heterogeneous storage system comprises a number $n_1$ of storage devices of a first type and a number $n_2$ of storage devices of a second type, with $n_1 > 1$ and/or $n_2 > 1$,
wherein the configuration parameters further includes said number $n_1$ and said number $n_2$; and wherein estimating the global reliability further comprises estimating the global reliability as would be obtained by varying one or each of said number $n_1$ and said number $n_2$, in addition to modifying the amounts of the data subsets.

7. The method of claim 6, wherein the numbers $n_1$ and $n_2$ of storage devices are varied subject to a given storage budget constraint.

8. The method of claim 1, wherein:
determining the initial global reliability comprises estimating an initial global mean time to data loss MTTDL, pertaining to the heterogeneous storage system, based on mean times to data loss $MTTDL_j$ for storage devices of type j, estimated according to the accessed configuration parameters including the respective amounts of the data subsets stored on the different types of storage devices; and
determining the increased global reliability comprises estimating a global mean time to data loss MTTDL, pertaining to the heterogeneous storage system, based on mean times to data loss $MTTDL_j$ for storage devices of type j, estimated according to the modified configuration parameters including the modified respective amounts of the data subsets stored on the different types of storage devices.

9. The method of claim 8, wherein a mean time to data loss estimated for a storage device of type j is defined as $MTTDL_j = \mu_j\hat{}(r_j-1)/(n_j\lambda_j\hat{}r_j)$, where $\mu_j$, $r_j$, $n_j$, and $\lambda_j$ respectively denote a rebuild rate, a replica number, a number, and a reliability characteristic of the storage devices of type j in the heterogeneous storage system.

10. The method of claim 9, wherein $\mu_j$ is defined as $\mu_j = b_j n_j/U_j$, where $b_j$ and $U_j$ respectively denote a rebuild bandwidth for a storage device of type j and an amount of data stored on all the storage devices of type j.

11. The method of claim 10, wherein the global mean time to data loss is estimated as a harmonic mean of the mean times to data loss $MTTDL_j$ of all the types of storage devices.

12. The method of claim 1, wherein determining the increased global reliability comprises estimating a global reliability as would be obtained by modifying, in addition to modifying the amounts of the data subsets, each of:
the numbers $n_j$ of the storage devices for each of the two or more types j, in a limit compatible with a given storage budget constraint for storing said dataset; and
the number of replicas of data stored on each of the storage devices of the two or more types.

13. The method of claim 1, wherein:
determining the initial global reliability comprises estimating an initial expected annual fraction of data loss pertaining to the heterogeneous storage system, based on expected annual fractions of data loss estimated for each type of storage devices according to the accessed configuration parameters including the respective amounts of the data subsets stored on the different types of storage devices; and
determining the increased global reliability comprises estimating a global expected annual fraction of data loss pertaining to the heterogeneous storage system, based on expected annual fractions of data loss estimated for each type of storage devices according to the modified configuration parameters including the modified respective amounts of the data subsets stored on the different types of storage devices.

14. The method of claim 13, wherein the global expected annual fraction of data loss is estimated as a weighted mean of the expected annual fractions of data loss, using weight coefficients defined as $U_i/(U_1+ \ldots +U_k)$, where $U_1+\ldots+U_k=U$ and $U_i$ denotes an amount of data stored on all of the storage devices of type i.

15. The method of claim 1, further comprising notifying an owner of the dataset of the increased global reliability determined, and wherein the dataset is reconfigured upon receiving acceptance from the owner to reconfigure the dataset according to the increased global reliability determined.

16. A heterogeneous storage system comprising two or more different types of storage devices, the devices storing respective data subsets of a dataset, the system storing a computerized method for increasing data storage reliability in the system, the computerized method executable by one or more processors of the system for the latter:
to access, via one or more processors, configuration parameters for the dataset stored on the storage devices, the configuration parameters including respective amounts, comprising $U_1$ and $U_2$, of the data subsets stored on the two or more different types of storage devices;
to estimate, via one or more processors, an initial global reliability of the heterogeneous storage system for the dataset, based on the accessed configuration parameters including at least the respective amounts of the data subsets stored on the two or more different types of storage devices;
to determine, via one or more processors, an increased global reliability of the heterogeneous storage system for the dataset, by estimating a global reliability as would be obtained by modifying at least some of the configuration parameters, wherein at least the respective amounts $U_1$ and $U_2$ of the data subsets stored on the two or more different types of storage devices are modified to increase the global reliability of the heterogeneous storage system for the dataset; and
to reconfigure the dataset stored across the heterogeneous storage system according to the modified configuration parameters including the modified respective amounts of the data subsets stored on the two or more different types of storage devices.

17. A computer program product for increasing data storage reliability in a heterogeneous storage system comprising two or more different types of storage devices, the devices storing respective data subsets of a dataset, the computer program product comprising a computer readable storage medium having program instructions embodied therewith, the program instructions executable by one or more processors:
to access, via one or more processors, configuration parameters for the dataset stored on the storage devices, the configuration parameters including respective amounts, comprising $U_1$ and $U_2$, of the data subsets stored on the two or more different types of storage devices;
to estimate, via one or more processors, an initial global reliability of the heterogeneous storage system for the dataset, based on the accessed configuration parameters including at least the respective amounts of the data subsets stored on the two or more different types of storage devices;
to determine, via one or more processors, an increased global reliability of the heterogeneous storage system for the dataset, by estimating a global reliability as would be obtained by modifying at least some of the configuration parameters, wherein at least the respective amounts $U_1$ and $U_2$ of the data subsets stored on the two or more different types of storage devices are modified to increase the global reliability of the heterogeneous storage system for the dataset; and
to reconfigure the dataset stored across the heterogeneous storage system according to the modified configuration parameters including the modified respective amounts of the data subsets stored on the two or more different types of storage devices.

18. The method of claim 1, wherein determining the increased global reliability comprises determining that the modified parameters are compatible with respective storage capacities of each storage device.

19. The method of claim 1, wherein estimating a given global reliability comprises:
estimating reliability measures for each of the two or more different types of storage devices, wherein a reliability measure for a given type of storage device is based at least in part on an amount of data stored on all storage devices of that type; and
estimating the global reliability based at least in part on:
the respective reliability measures for each of the two or more different types of storage devices; and
the respective amounts of the data subsets stored on the two or more different types of storage devices.

20. The method of claim 1, wherein said respective amounts of the data subsets stored on the two or more different types of storage devices comprise respective percentages of the data subsets stored on the two or more different types of storage devices.

* * * * *